March 21, 1961   R. I. N. WEINGART   2,975,887
DISPENSING CONTAINER
Filed Feb. 17, 1959
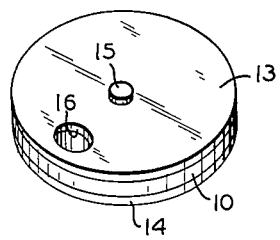
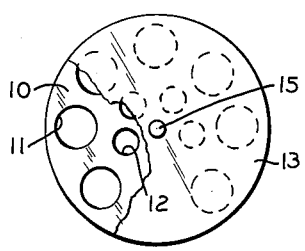
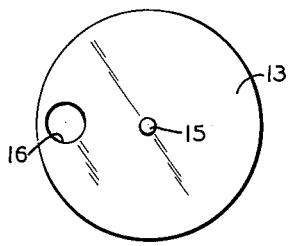
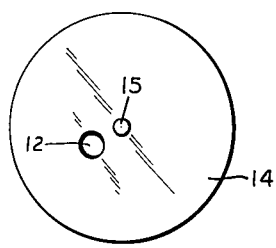
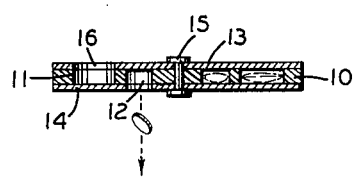
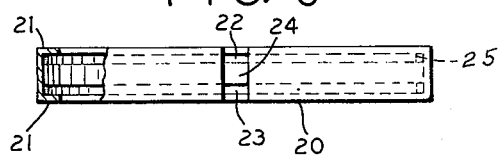
INVENTOR.
RICHARD I. N. WEINGART
BY John P. Chandler
HIS ATTORNEY.

United States Patent Office 2,975,887
Patented Mar. 21, 1961

2,975,887

DISPENSING CONTAINER

Richard I. N. Weingart, 860 5th Ave., New York, N.Y.

Filed Feb. 17, 1959, Ser. No. 793,896

4 Claims. (Cl. 206—42)

This invention relates to dispensing containers and relates more particularly to a novel flat container for pills, medicinal capsules, or the like, wherein a plurality of rows of spaced recesses or pockets are arranged in concentric circles in a housing or body section. On the opposed faces of this housing two relatively rotatable covers are mounted, each with an opening aligned with the pill-receiving recesses of one of the circles.

An important object of the invention is to provide a novel dispensing container of this character which is especially adapted for inexpensive manufacture from transparent or translucent stock plastic materials and obviating the necessity of constructing expensive dies for a molding operation. The entire container may be inexpensively manufactured by drilling stacks of several body sections and stacks of covers in the same manner.

If a large production of the item is desired it will be cheaper in the long run to make dies for the manufacture of the article, so the method used is a matter of choice. There are some desirable plastic materials which are difficult to mold so the cutting and drilling operation can be used for these plastics with facility. The invention is not limited to the use of any particular material for its construction and combinations of materials may also be used.

One circularly arranged row of pill-receiving openings is disposed near the outer periphery of the body and an opening in one rotatable cover can be successively aligned with each one of these openings. The second row of spaced openings may be disposed in a circle nearer to the central axis and a hole in the opposite cover disc may similarly be aligned with these openings. This arrangement permits only one recess to be exposed at a time.

In this connection it is preferable, though by no means necessary, to have the latter holes of smaller diameter to receive pills of smaller diameter than those in the first row. Even if all the pill-receiving openings are of the same diameter the user will be able to distinguish between two different kinds of pills by their different locations.

An important object of the invention is to provide a novel container to selectively dispense different types of pills and a further object is to utilize more of the space available in the body section than has heretofore been possible in containers of this general type.

The circular bodies may be mounted for independent rotation by means of a central pivot pin passing through the central axis or by external supporting means which retain the circular bodies in face-to-face engagement and their common axes in alignment.

In the drawing:

Fig. 1 is a perspective view of a dispensing container embodying the present invention.

Fig. 2 is a plan view thereof with a portion of the upper cover broken away to show a partial plan view of the body section.

Fig. 3 is a plan view of one rotatable cover.

Fig. 4 is a plan view of the second rotatable cover.

Fig. 5 is a central section taken through the dispensing container.

Fig. 6 shows a modification wherein the central pivot pin is eliminated and a split retaining ring is employed to retain the rotational axes of the body section and cover discs in alignment.

The dispensing container of the present invention has a body section 10, preferably of circular shape, and provided with a row of spaced openings 11 located adjacent the outer periphery and arranged in a circle concentric with the central opening. A second row of openings 12 are also arranged in a circle of smaller diameter and the latter openings are illustrated as being of smaller diameter than openings 11, although the invention is not by any means so limited.

Two covers, 13 and 14, one overlying each face of the body and preferably of the same diameter as the body, are mounted for relative independent rotation on the body by appropriate means such as a central pivot element 15 which may be a rivet which has a fixed head at one end and is headed over at its opposite end, or it may be a hollow grommet which is headed over at both ends. In heading up the grommet or rivet it is desirable to employ sufficient care to not only securely mount the cover discs on the body section, but also to provide an approved measure of resistance to rotation while permitting free rotation when it is desired to eject a pill.

One cover disc has a circular opening 16 having a center aligned with each one of the openings 11, and the other cover has an opening 17 which can be aligned with openings 12. Although the openings are equally spaced, it will be noted one area in each circular row has no opening. This is to allow openings 16—17 to occupy one position where no recess is uncovered.

In the modified arrangement of Fig. 6 the central pivot pin is eliminated and a split retaining ring 20 having upper and lower flanges 21 is used to retain the cover discs 22 and 23 in face-to-face engagement with the body section 24. The circular members are readily inserted within the ring by spreading the ends of the latter slightly. By forming the cover discs of slightly less diameter than the body section, as shown at 25, the compressive action of the split ring around its periphery acts principally on the outer periphery of the body section which is thus held relatively immovable by the ring so that the cover discs may be readily turned.

This arrangement has the added advantage that the circular bodies can be removed from the ring for periodic cleaning. If it is not desired to provide this convenience the ring may be made continuous rather than split and the second flange formed after the second disc is in place.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A dispensing container comprising a pair of generally flat cover discs and a generally flat body member mounted between the cover discs in face-to-face relation, each of said cover discs being mounted for rotation relative to the body member independent of each other and of the body member, and means for mounting the three members in such superimposed relation and for maintaining their rotational axes in alignment, the body section having two rows of through openings arranged in circles of different diameters but concentric with the common axis of rotation and forming article receiving pockets, each cover disc having an opening which can be successively aligned with the openings in one of said circles and through which an article contained in a pocket can be removed.

2. The structure recited in claim 1 wherein the mounting means comprises a pivot pin, the superimposed members having aligned openings to receive the pivot pin.

3. The structure recited in claim 1 wherein the mounting means comprises a ring enclosing the outer peripheries of the superimposed members, said ring having flanges overlying the margins of the cover discs.

4. A dispensing container comprising a generally flat body section having a central opening and a plurality of rows of through openings arranged in circles concentric with the central opening, and cover discs overlying opposed faces of the body section and provided with central openings, and a pivotal element passing through the central openings and mounting the cover discs for independent rotative movement relative to the body section, each cover disc having an opening so spaced from the central opening that upon rotation of said cover disc the opening can be aligned with each of the openings in one of the rows of openings in the body section.

References Cited in the file of this patent

UNITED STATES PATENTS

| | | |
|---|---|---|
| 2,717,470 | Holdeman | Sept. 13, 1955 |
| 2,734,306 | Holdeman | Feb. 14, 1956 |
| 2,780,349 | Tornberg | Feb. 5, 1957 |

FOREIGN PATENTS

| | | |
|---|---|---|
| 299,873 | Switzerland | Sept. 1, 1954 |